(12) United States Patent
Xu et al.

(10) Patent No.: US 9,940,537 B2
(45) Date of Patent: Apr. 10, 2018

(54) MEDICAL IMAGE PROCESSING APPARATUS, MEDICAL IMAGING APPARATUS AND MEDICAL IMAGE PROCESSING METHOD

(71) Applicant: Toshiba Medical Systems Corporation, Otawara-shi (JP)

(72) Inventors: Jin Xu, Beijing (CN); Qiuying Dong, Beijing (CN); Pengfei Liu, Beijing (CN); Jianchun Zhao, Beijing (CN)

(73) Assignee: Toshiba Medical Systems Corporation, Otawara-shi (JP)

( * ) Notice: Subject to any disclaimer, the term of this patent is extended or adjusted under 35 U.S.C. 154(b) by 30 days.

(21) Appl. No.: 14/952,122

(22) Filed: Nov. 25, 2015

(65) Prior Publication Data
US 2016/0148377 A1    May 26, 2016

(30) Foreign Application Priority Data
Nov. 26, 2014   (CN) .......................... 2014 1 0708751

(51) Int. Cl.
*G06K 9/00* (2006.01)
*G06K 9/46* (2006.01)
*G06T 7/11* (2017.01)

(52) U.S. Cl.
CPC ............. *G06K 9/46* (2013.01); *G06K 9/4642* (2013.01); *G06T 7/11* (2017.01); *G06K 2209/055* (2013.01); *G06T 2207/10072* (2013.01); *G06T 2207/30012* (2013.01)

(58) Field of Classification Search
CPC ........................ G06T 7/11; G06T 2207/30012
See application file for complete search history.

(56) References Cited

U.S. PATENT DOCUMENTS

| | | | |
|---|---|---|---|
| 6,608,916 B1 | 8/2003 | Wei et al. | |
| 7,046,830 B2 | 5/2006 | Gerard et al. | |
| 7,561,728 B2* | 7/2009 | Abufadel | G06T 7/149 382/132 |
| 7,672,493 B2 | 3/2010 | Qing et al. | |
| 8,625,869 B2* | 1/2014 | Harder | G06T 15/08 382/131 |
| 2007/0127799 A1 | 6/2007 | Reisman et al. | |
| 2010/0177946 A1 | 7/2010 | De Bruijne et al. | |
| 2010/0232661 A1* | 9/2010 | Hisanaga | G06F 19/321 382/128 |
| 2013/0053658 A1* | 2/2013 | Peacock | A61B 5/055 600/309 |

(Continued)

*Primary Examiner* — Oneal R Mistry
(74) *Attorney, Agent, or Firm* — Oblon, McClelland, Maier & Neustadt, L.L.P.

(57) ABSTRACT

A medical image processing apparatus according to an embodiment includes setting circuitry, calculation circuitry, and recognition circuitry. The setting circuitry is configured to set a region of interest (ROI) of each of a plurality of sagittal plane images of medical images resulting from scanning an examinee. The calculation circuitry is configured to calculate an evaluation index based on a bipolarity feature of each block in the ROI related to change of pixel values and a similarity feature among the blocks. The recognition circuitry is configured to select the ROI according to the calculation result of the calculation circuitry and recognize a sagittal plane image in which the selected ROI is located as a target sagittal plane image of a median sagittal plane passing through a spine.

17 Claims, 11 Drawing Sheets

(56) References Cited

U.S. PATENT DOCUMENTS

2015/0325018 A1* 11/2015 Ben Ayed .................. G06T 7/11
                                                            382/132
2016/0210742 A1*  7/2016 Weiss ..................... B60R 25/00

* cited by examiner

FIG.7A   FIG.7B   FIG.7C
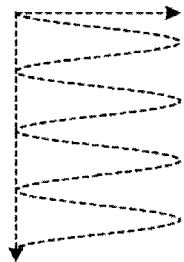
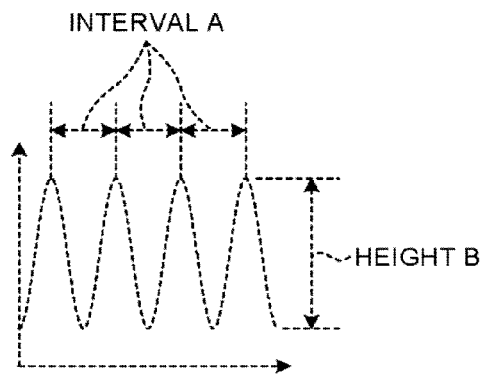
FIG.8
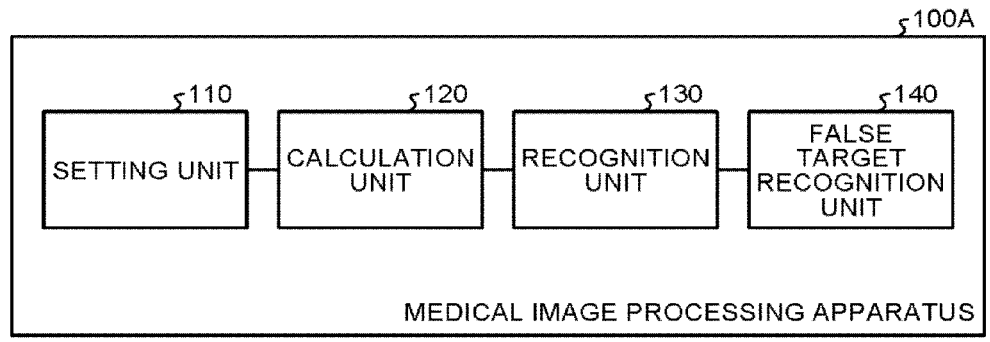

MEDICAL IMAGE PROCESSING APPARATUS, MEDICAL IMAGING APPARATUS AND MEDICAL IMAGE PROCESSING METHOD

CROSS-REFERENCE TO RELATED APPLICATIONS

This application is based upon and claims the benefit of priority from Chinese Patent Application No. 201410708751.9, filed on Nov. 26, 2014, the entire contents of which are incorporated herein by reference.

FIELD

Embodiments described herein relate generally to a medical image processing apparatus, a medical imaging apparatus and a medical image processing method

BACKGROUND

It is common to detect a target object from a medical image in the medical image processing field. For example, it is of important clinical significance to determine a sagittal plane image (also called a median sagittal plane image) in which a spine is located from a series of sagittal plane images of a human body, and to detect intervertebral disks from the determined sagittal plane image. Information of the detected intervertebral disks, such as the position and the direction thereof, can be used to guide the subsequent spine scanning performed in an image of higher quality.

BRIEF DESCRIPTION OF THE DRAWINGS

The present embodiment will be better understood with reference to the following description taken in conjunction with accompanying drawings in which identical or like reference signs denote identical or like components. The accompanying drawings, together with the detailed description below, are incorporated into and form a part of the specification and serve to illustrate, by way of example, preferred embodiments of the present invention and to explain the principle and advantages of the present invention. In the accompanying drawings:

FIG. 7A, FIG. 7B and FIG. 7C are schematic diagrams illustrating the distribution of the horizontal projection of a spine;

FIG. 8 is a block diagram schematically illustrating a medical image processing apparatus according to another embodiment;

DETAILED DESCRIPTION

Figure 1:
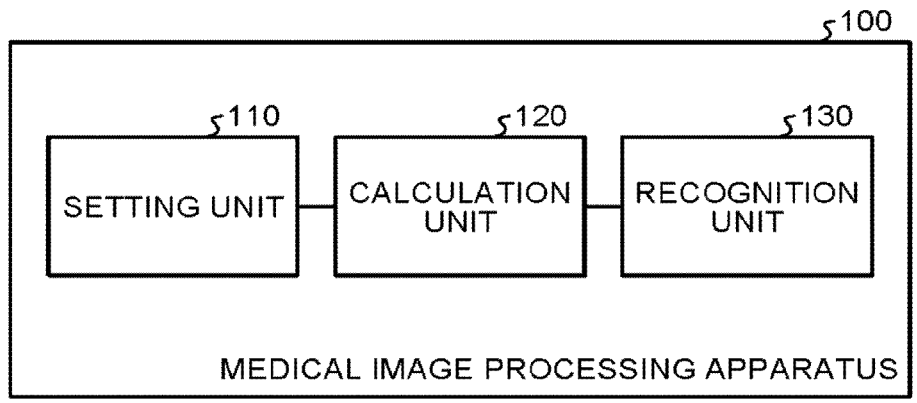
FIG. 1 is a block diagram schematically illustrating a medical image processing apparatus according to an embodiment.

A medical image processing apparatus according to an embodiment includes setting circuitry, calculation circuitry, and recognition circuitry. The setting circuitry is configured to set a region of interest (ROI) of each of a plurality of sagittal plane images of medical images resulting from scanning an examinee. The calculation circuitry is configured to calculate an evaluation index based on a bipolarity feature of each block in the ROI related to change of pixel values and a similarity feature among the blocks. The recognition circuitry is configured to select the ROI according to the calculation result of the calculation circuitry and recognize a sagittal plane image in which the selected ROI is located as a target sagittal plane image of a median sagittal plane passing through a spine.

A brief summary of the present embodiment is given below to provide a basic understanding regarding some aspects of the present embodiment. It should be appreciated that the summary, which is not an exhaustive overview of the present embodiment, is not intended to identify the key or critical parts of the present embodiment, nor to limit the scope of the present embodiment, but merely to give some concepts in a simplified form as a prelude to the more detailed description to be discussed later.

It is an object of the present embodiment to provide a medical image processing apparatus, a medical image processing method and a medical imaging apparatus by means of which the sagittal plane image of a median sagittal plane passing through a spine can be obtained more accurately to improve the accuracy of the subsequent processing such as the subsequent intervertebral disk detection.

In accordance with an aspect of the present embodiment, a medical image processing apparatus is provided which comprises: a setting unit, configured to set a ROI of each of a plurality of sagittal plane images of medical images resulting from scanning an examinee; a calculation unit, configured to calculate an evaluation index based on a bipolarity feature of each block in the ROI related to change of pixel values and a similarity feature among the blocks; and a recognition unit, configured to select the ROI according to the calculation result of the calculation unit and recognize a sagittal plane image in which the selected ROI is located as a target sagittal plane image of a median sagittal plane passing through a spine.

In accordance with another aspect of the present embodiment, a medical image processing method is provided which comprises: setting a ROI of each of a plurality of sagittal plane images of medical images resulting from scanning an examinee; calculating an evaluation index based on a bipolarity feature of each block in the ROI related to change of pixel values and a similarity feature among the blocks; selecting the ROI according to the calculation result; and recognizing a sagittal plane image in which the selected ROI is located as a target sagittal plane image of a median sagittal plane passing through a spine.

In accordance with yet another aspect of the present embodiment, a medical imaging apparatus is provided which includes the medical image processing apparatus according to the above mentioned aspect.

Further, in accordance with yet another aspect of the present embodiment, a computer program for realizing the foregoing medical image processing method is provided.

Further, in accordance with yet still another aspect of the present embodiment, a computer program product at least in a non-transient computer-readable medium form is provided on which computer program codes for realizing the foregoing medical image processing method are recorded.

In the method, apparatus disclosed herein, an evaluation index which is based on the bipolarity feature and the similarity feature of an ROI of an examinee is calculated, and one sagittal plane image in which the ROI of the examinee is located is selected as a target sagittal plane image based on the evaluation index. As the unique image feature of the intervertebral disks of a spine is taken into consideration, the sagittal plane image of a median sagittal plane can be obtained more accurately to facilitate the subsequent processing such as the subsequent intervertebral disk detection.

Embodiments are described below with reference to accompanying drawings. The elements and features described in an accompanying drawing or embodiment can be combined with those shown in one or more other accompanying drawings or embodiments. It should be noted that for the sake of clarity, the components and processing unrelated to the present embodiment and well known to those of ordinary skill in art are omitted in accompanying drawings and description.

As stated above, it is of important clinical significance to determine the sagittal plane image in which a spine is located from a series of sagittal plane images of a human body and to detect intervertebral disks from the determined sagittal plane image. Anatomically, a sagittal plane is a section cutting a human body into a left part and a right part from anterior to posterior. The section bisecting a human body into left and right halves from anterior to posterior is called a median sagittal plane or a median plane for short. Generally, a median sagittal plane passes through important tissues including spine, and common sagittal planes are sections passing through a human body parallel to the median sagittal plane, not passing through the spine. Accordingly, the image obtained by scanning a human body from anterior to posterior is called a sagittal plane image, wherein the image corresponding to the median sagittal plane is also hereinafter referred to as a median sagittal plane image. The scanning may be the scanning implemented on a human body using existing medical imaging apparatus, such as magnetic resonance imaging.

To detect an intervertebral disk, first, it is required to find the sagittal plane image of the median sagittal plane passing through a spine from a plurality of sagittal plane images resulting from scanning a human body, that is, to find a median sagittal plane image. The more accurate the median sagittal plane image found is, the more accurate the intervertebral disk detection performed on the median sagittal plane image is.

FIG. 1 is a block diagram schematically illustrating a medical image processing apparatus according to an embodiment. As shown in FIG. 1, the medical image processing apparatus 100 comprises a setting unit 110, a calculation unit 120 and a recognition unit 130. The working flow of the medical image processing apparatus 100 is schematically described below with reference to FIG. 2.

Figure 2:
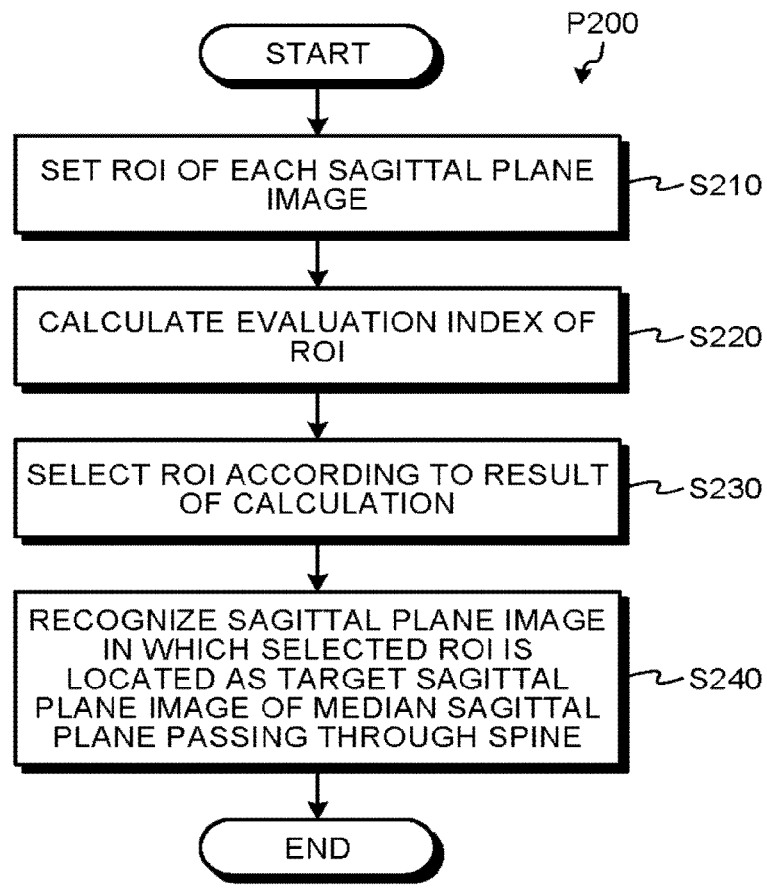
FIG. 2 is a flowchart schematically illustrating the working flow of the medical image processing apparatus shown in FIG. 1.

FIG. 2 is a flowchart schematically illustrating the working flow of the medical image processing apparatus shown in FIG. 1, that is, a flowchart schematically illustrating a medical image processing method according to an embodiment. As shown in FIG. 2, in a method P200, a Region of Interest (ROI) of each of a plurality of sagittal plane images of the medical images resulting from scanning an examinee is set in Step S210. The ROI of the examinee represents a region of a sagittal plane image in which the examinee may be contained, that is, a ROI is an examinee region in a sagittal plane image. For example, each of the sagittal plane images is a locator image taken by an MRI (magnetic resonance imaging) apparatus for confirming the position of intervertebral disks. A ROI can be determined from a sagittal plane image using any proper existing technology. For example, the setting unit 110 extracts a region including spines (a spinal-region) as the ROI in each of the sagittal plane images, based on distribution of signal values. For example, the setting unit 110 craniocaudally adds up signal values at respective positions in an anterior-posterior axis, thereby obtains anteroposterior distribution of signal values. The anteroposterior direction corresponds to a horizontal direction of the sagittal plane image. The craniocaudally direction corresponds to a longitudinal direction. The spines including the intervertebral disks and the vertebral bodies run craniocaudally and the signal values of the spines are different from the signal values of abdominal tissues for example. The setting unit 110 determines, in the anteroposterior distribution, an anteroposterior range whose distribution is different from distribution of the surrounding range as the spinal-region. The setting unit 110 might exclude a sagittal plane image from which the spinal-region is not extracted by the above-described process from subsequent processing targets.

In step S220, an evaluation index which is based on a bipolarity feature of each block en the ROI that is related to the chance of pixel values and a similarity feature among the blocks is calculated.

Figure 3A:
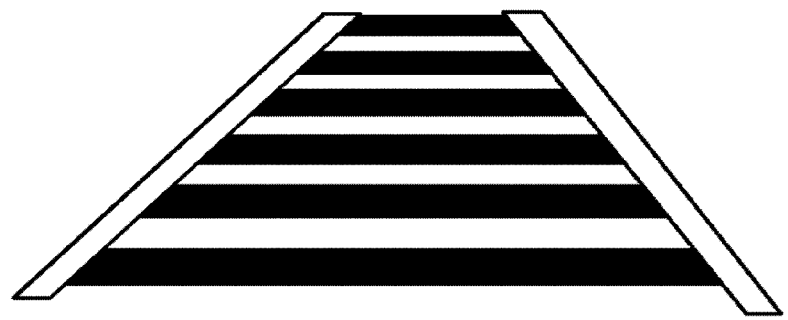
FIG. 3A and FIG. 3B are schematic diagrams illustrating the application principle of a bipolarity feature according to the embodiment.

In the image processing field, the bipolarity feature represents the intensity of the change of the pixel values of each block en an image area Generally, if black pixels and white pixels are dramatically alternated in an image area, then the image area may have a high bipolarity. For example, the image of a pedestrian crosswalk is a common high-bipolarity image. As shown in FIG. 3A, white bands and black bands alternate in the area outlined by the black frame, thus, the pixel values of the image blocks in the area change intensively, resulting in the high bipolarity of the area Like a pedestrian crosswalk, as shown in FIG. 3E, as the intervertebral disk of a spine sharply contrasts with the part between intervertebral disks (a vertebral body), which means that the pixel values of the intervertebral disk and the part between intervertebral disks change dramatically, besides, as the intervertebral disk and the part between intervertebral disks are alternatively distributed, the image of the spine has a significant bipolarity feature, like a pedestrian crosswalk. As an example but not a limitation, the bipolarity feature value of an image block can be calculated using the following formula of prior art:

$$\gamma \equiv \frac{1}{\sigma_0^2}\{\alpha(1-\alpha)(\mu_1-\mu_2)^2\}. \quad \text{(formula 1)}$$

In formula 1, $\gamma$ represents the bipolarity feature value of an image block, $\sigma_0^2$ represents the variance of the image block itself, $\mu_1$ and $\mu_2$ represent the mean of the black areas and the mean of the white areas obtained by dividing the pixels in the image block according to a preset threshold respectively, $\alpha$ represents the area ratio of the black areas to the white areas in the block which is estimated empirically, and $\alpha$ is equal to or greater than 0 but equal to or smaller than 1. For example, $\alpha$ may be set to be 0.5. In the formula 1 above, $\gamma$ is equal to or greater than 0 but equal to or smaller than 1. When $\gamma$ is 1, the image block has a perfect bipolarity. When $\gamma$ is 0, the image block is not bipolar.

A similarity feature represents the similarity of the bipolarity features between image blocks. A larger area having a strong bipolarity feature can be determined by a plurality of adjacent image blocks having a strong similarity feature to exclude an isolated image block having a strong bipolarity feature. As an example but not a limitation, the similarity of an image block with respect to another image block may be calculated using the following formula of prior art:

$$s = \frac{\min(\mu_2, \tilde{\mu}_2) - \max(\mu_1, \tilde{\mu}_1)}{\max(\mu_2, \tilde{\mu}_2) - \min(\mu_1, \tilde{\mu}_1)} \quad \text{(formula 2)}$$

In formula 2, s represents the similarity of an image block 1 with respect to an image block 2, $\mu_1$ and $\mu_2$ represent the mean of the black areas and the mean of the white areas obtained by dividing the pixels in the image block 1 according to a preset threshold respectively, $\tilde{\mu}_1$ and $\tilde{\mu}_2$ represent the mean of the black areas and the mean of the white areas obtained by dividing the pixels in the image block 2 according to a preset threshold respectively, min( ) is a minimum value taking function, and max( ) is a maximum value taking function.

The size of each image block, to which no limitation is given here, can be set as needed. For example, the calculation unit 120 splits the ROI to a plurality of blocks by dividing the ROI in the longitudinal direction (the craniocaudally direction) using a preset number (N). Alternatively, the calculation unit 120 allocates a block whose size is predetermined (horizontal size: X cm, vertical size: Y along the longitudinal direction in the ROI. For example, at least one of X and Y is set according to the size of the intervertebral disk and the size of the vertebral bodies. Further, at least one of X and Y might be changed according to an examination region. For example, the medical image processing apparatus 100 comprises a memory which stores a set of "X and Y for a lumbar vertebra", a set of "X and Y for a dorsal vertebra", and the like. The calculation unit 120 allocates the blocks by obtaining the examination region and obtaining a set of X and Y corresponding to the obtained examination region from the memory. The calculation unit 120 might use a plurality number as N each of which is set according to each of examination regions. Further, the calculation unit 120 might obtain a curve which the spines pass by an image processing and allocate the blocks along the obtained curve.

Sequentially, refer to FIG. 2, in Step S230, an ROI is selected according to the result of the calculation. Then, in step S240, the sagittal plane image in which the selected ROI is located is recognized as the target sagittal plane image of a median sagittal plane passing through a spine.

Here, Step S210 may be executed by the setting unit 110, Step S220 may be executed by the calculation unit 120, and Steps S230 and S240 may be executed by the recognition unit 130.

In the foregoing embodiments, an evaluation index which is based on the bipolarity feature of each image block in an ROI and the similarity feature among the blocks is calculated, and an ROI the sagittal plane image which it is located is the target sagittal plane image of a median sagittal plane passing through a spine is selected according to the evaluation index. The stronger the bipolarity feature of an image block is, the higher the possibility of this image block pertaining to a spine is. To exclude an isolated non-spine image block having a strong bipolarity feature, the similarity feature among image blocks, especially the similarity feature among adjacent image blocks, is further used here. The similarity feature among adjacent image blocks being strong represents that the adjacent image blocks are not isolated image blocks having strong bipolarity feature, and that they are more likely to pertain to a spine. Based on this principle, an ROI can be selected.

As an example, the energy of an ROI can be calculated according to the bipolarity feature and the similarity feature, an ROI having a relatively high energy can be selected, and the sagittal plane image in which the ROI is located can be recognized as the target sagittal plane image of a median sagittal plane passing through a spine, thereby determining the median sagittal plane image accurately. Certainly, evaluation indexes based on these two features defined in other ways are also applicable.

Figure 4:
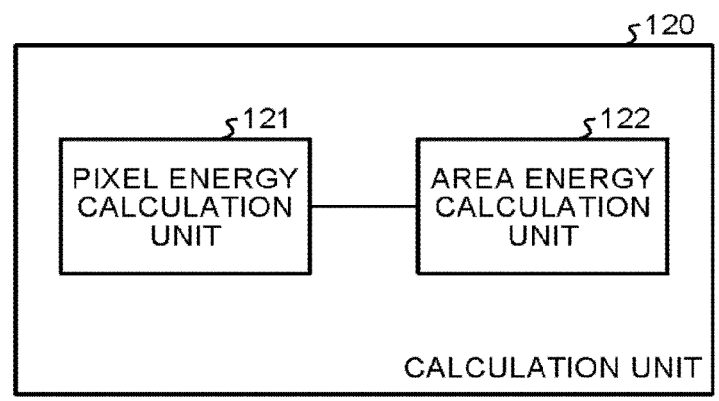
FIG. 4 is a block diagram schematically illustrating a calculation unit according to an embodiment.
Figure 5:
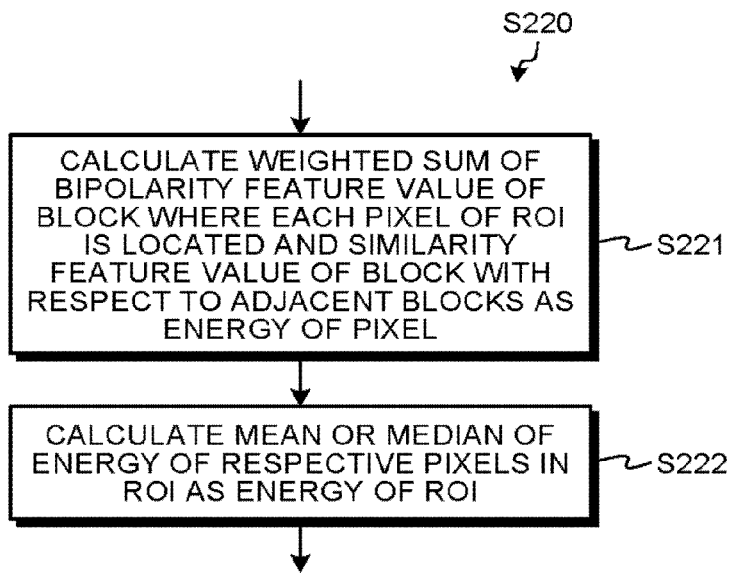
FIG. 5 is a flowchart schematically illustrating the working flow of the calculation unit shown in FIG. 4.

In the foregoing embodiments, the calculation unit 120 can calculate the energy of an ROI using various proper methods. As an example but not a limitation, in an embodiment, the energy of an ROI is estimated based on a weighted sum of the bipolarity feature and the similarity feature. FIG. 4 is a block diagram schematically illustrating a calculation unit according to an embodiment. As shown in FIG. 4, the calculation unit 120 includes a pixel energy calculation unit 121 and an area energy calculation unit 122. FIG. 5 is a flowchart schematically illustrating the working flow of the calculation unit shown in FIG. 4. As shown in FIG. 5, Step S220 may include Step S221 which may be executed by the pixel energy calculation unit 121: calculating the weighted sum of the bipolarity feature value of the block where each pixel of the ROI is located and the similarity feature value of the block with respect to adjacent blocks as the energy of the pixel. For example, the energy Ei of a pixel i is calculated as: Ei=a*$\gamma_i$+b*$s_i$, in which $\gamma_i$ is the bipolarity feature value of the image block where the pixel i coated, $s_i$ is the similarity feature value of the image block where the pixel i is located with respect to adjacent image blocks (e.g. adjacent light image blocks), and a and b are weights of the bipolarity feature and the similarity feature of the pixel respectively. The weights a and b can be set according to the actual requirement. For example, the calculation unit 120 calculates energy of each of the pixels, after fixedly allocating the blocks in the ROI by using any one of methods described above. In this case, energy of each of the pixels located in the same block is the same value. Alternatively, the calculation unit 120 allocates the block for each of pixels. For example, the calculation unit 120 allo a block (horizontal size: X cm, vertical size: Y in which the pixel i is centrally-located and allocates blocks among which this block is centrally-located by using any one of methods described above. In FIG. 5, Step S220 may further include Step S222 which may be executed by the area energy calculation unit 122: calculating a mean or median of the energy of the respective pixels in the ROI as the energy of the ROI.

Figure 6:
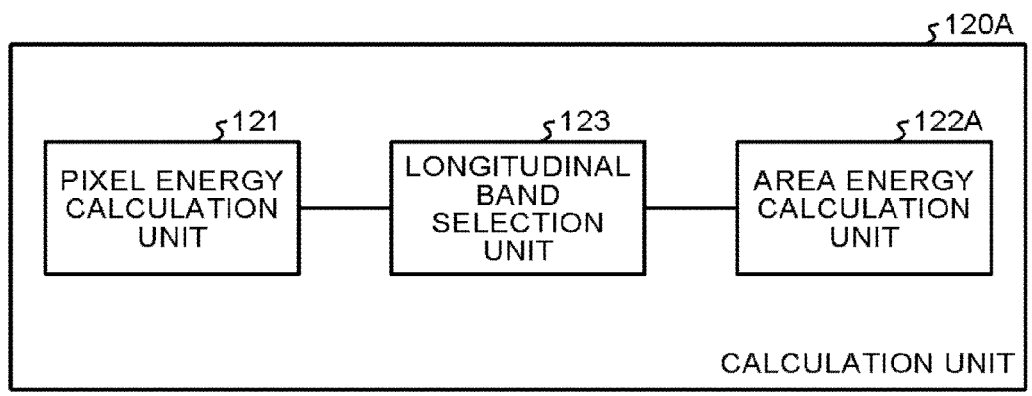
FIG. 6 is a block diagram schematically illustrating a calculation unit according to another embodiment.

FIG. 6 is a block diagram schematically illustrating the calculation unit according to another embodiment. As shown in FIG. 6, a calculation unit 120A includes a pixel energy calculation unit 121, a longitudinal band selection unit 123 and an area energy calculation unit 122A. The longitudinal band selection unit 123 is configured to determine the longitudinal band of the highest energy in each ROI, wherein the energy of a longitudinal band refers to the mean or the median of the energy of the respective pixels in the longitudinal band. The size of the longitudinal band can be determined in advance according to requirement. For example, longitudinal bands of different positions can be obtained in turn by scanning an ROI using a longitudinal band window which is as high as but narrower than the ROI. The area energy calculation unit 122A takes the energy of the longitudinal band selected by the longitudinal band selection unit 123 as the energy of a corresponding ROI. For example, the calculation unit 120A obtains the longitudinal bands of different positions by moving the longitudinal band window along the horizontal direction in the ROI at regular interval. The calculation unit 120A calculates energy of each of the pixels in a longitudinal band, thereby obtains the energy of the longitudinal band. Then, the calculation unit 120A determines the highest energy among a plurality piece of energy of the longitudinal bands as the energy of the ROI. The calculation unit 120A performs the above-described process in each of the sagittal plane images. In this way, the recognition unit 130 can select a sagittal plane image in which an ROI having a relatively high energy is located as the target sagittal plane image of a median sagittal plane passing through a spine. As a longitudinal band is smaller in size than an ROI, by selecting a longitudinal band having a relatively high energy, the area where a spine is located can be selected more accurately. Because tissues except the spines might include in the ROI, the energy value (the evaluation index) from which noise component is removed could be obtained by using the longitudinal band which is smaller than the ROI as the calculation target.

Research has found that the horizontal projection of the intervertebral disks of a spine to a sagittal plane image is distributed according to a certain rule. For example, the horizontal projection is craniocaudally distribution of signal values in the sagittal plane image and is obtained by anteroposteriorly adding up signal values at respective positions in a craniocaudal axis. There is a periodicity ill a profile of the horizontal projection, because the intervertebral disk and the vertebral body are alternately arranged in the spine. FIG. 7A-FIG. 7C are schematic diagrams illustrating the distribution of the horizontal projection of a spine. FIG. 7A is a schematic diagram illustrating a group of intervertebral disks of a spine. The group of intervertebral disks includes four intervertebral disks, the upper edges and the lower edges of which are schematically shown in FIG. 7A. FIG. 7B is a schematic diagram illustrating the horizontal projection of a sagittal plane image in which the intervertebral disks shown in FIG. 7A are contained. The convex waves in the horizontal projection shown in FIG. 7B correspond to the intervertebral disks shown in FIG. 7A, respectively. FIG. 7C is a schematic diagram illustrating a horizontal projection which is obtained by anticlockwise rotating the horizontal projection shown in FIG. 7B by 90 degrees so as to be observed conveniently. As shown in FIG. 7C, the intervals A between the respective peaks in the horizontal projection are approximate (substantially equal), and the peak values B (the height B) of the peaks are also approximate (substantially equal). This is because the intervertebral disks in a spine are substantially parallel to each other and nearly equal to each other in diameter.

Based on the above features of the horizontal projection of intervertebral disks, a false target sagittal plane image in which no intervertebral disk is contained can be detected from the recognized target sagittal plane images and then removed.

FIG. 8 is a block diagram schematically illustrating a medical image processing apparatus according to another embodiment. As shown in FIG. 8, besides the setting unit 110, the calculation unit 120 and the recognition unit 130 as shown in FIG. 1, the medical image processing apparatus 100A further includes a false target recognition unit 14C for recognizing a false target sagittal plane image from the target sagittal plane images recognized by the recognition unit 130.

Figure 9:
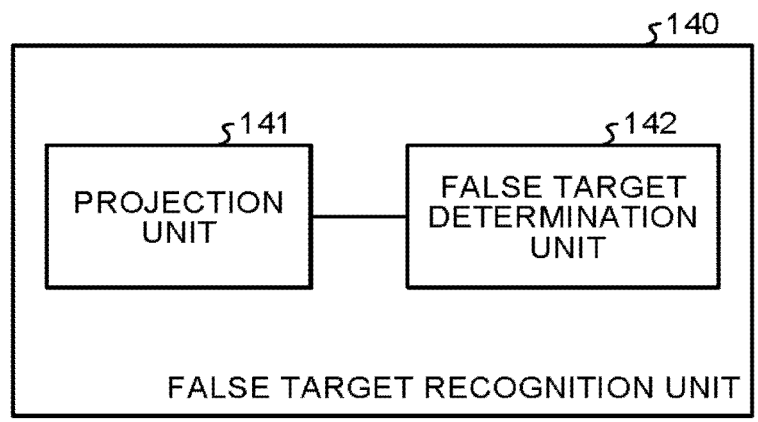
FIG. 9 is a block diagram schematically illustrating a false target recognition unit shown in FIG. 8.
Figure 10:
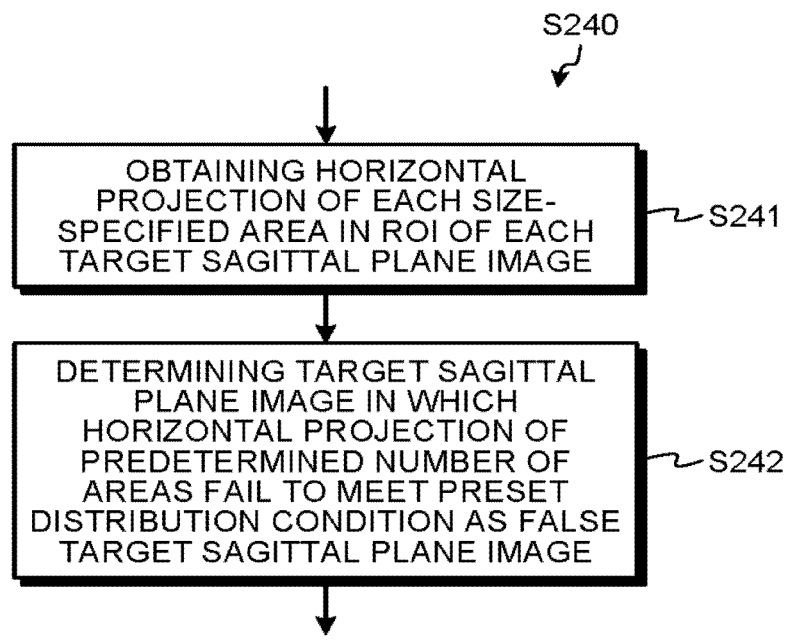
FIG. 10 is a flowchart schematically illustrating the working flow of the false target recognition unit shown in FIG. 9.

FIG. 9 is a block diagram schematically illustrating a false target recognition unit shown in FIG. 8. As shown in FIG. 9, a false target recognition unit 140 includes a projection unit 141 and a false target determination unit 142. FIG. 10 is a flowchart schematically illustrating the working flow of the false target recognition unit shown in FIG. 9. As shown in FIG. 10, a false target recognition process S240 includes: obtaining the horizontal projection of each size-specified area in the ROI of each target sagittal plane image in Step S241, and determining a target sagittal plane image in which the horizontal projection of a predetermined number of areas fail to meet a preset distribution condition as a false target sagittal plane image in Step S242. The preset distribution condition is: the peak values of a plurality of peaks in the horizontal projection are approximate; and the intervals between the plurality of peaks in the horizontal projection are approximate. Step S241 may be executed by the projection unit 141, and Step S242 may be executed by the false target determination unit 142. For example, the projection unit. 141 allocates the plurality of blocks by dividing the ROI by N or by allocating a block (horizontal size: X cm, vertical size: Y cm) in the ROI as described above. Then, the projection unit 141 obtains the horizontal projection of each of the blocks. The value of N or the value of Y might be set such that at least three intervertebral disks are included in one block. The false target determination unit 142 determines a target sagittal plane image having more than one block from which a horizontal projection failing to meet the distribution condition is obtained as the false target sagittal plane image. Further, the projection unit 141 might use the longitudinal band whose energy serves as energy of the ROI, as the obtaining target of the horizontal projection.

The projection unit 141 can project an object horizontally using various proper existing technologies. For example, the horizontal projection of each area can be obtained by setting a predetermined pixel threshold. Alternatively, the target sagittal plane image may be binarized and then horizontally projected. For example, the projection unit 141 is able to perform a horizontal projection process against an edge enhancement image of the ROI or the longitudinal band. Alternatively, for example, the projection unit 141 is able to perform a horizontal projection process against a binarized image of the ROI or the longitudinal band. The false target determination unit 142 might select the false target sagittal plane image among the target sagittal plane images based on the overall shape of the horizontal projection of the ROI or the longitudinal band.

Figure 11:
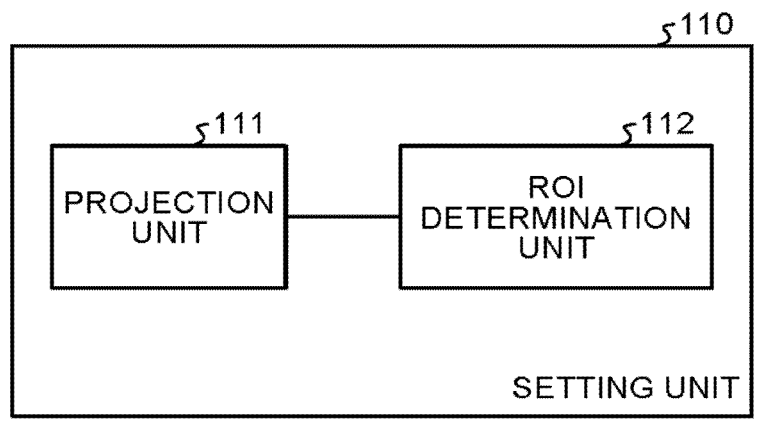
FIG. 11 is a block diagram schematically illustrating a setting unit according to an embodiment.
Figure 12:
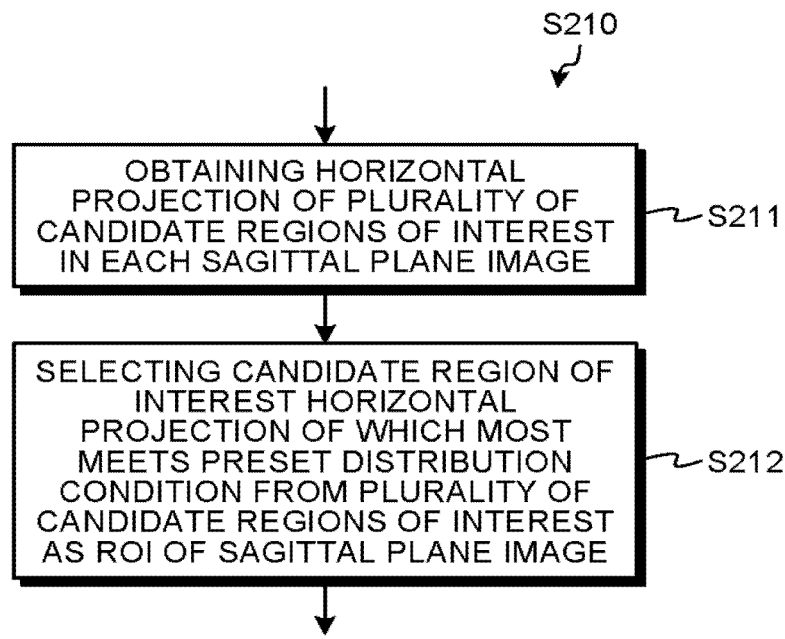
FIG. 12 is a flowchart schematically illustrating the working flow of the setting unit shown in FIG. 11.

Apart from being used to recognize a false target sagittal plane image, the distribution feature of the horizontal projection of intervertebral disks can also be used to recognize a ROI from a sagittal plane image. FIG. 11 is a block diagram schematically illustrating a ROI recognition unit according to an embodiment. In FIG. 11, the setting unit 110 serving as a ROI recognition unit includes a projection unit 111 and a ROI determination unit 112. FIG. 12 is a flowchart schematically illustrating the working flow of the ROI recognition unit shown in FIG. 11. In FIG. 12, during a ROI recognition process S210, the horizontal projection of a plurality of candidate regions of interest in each sagittal plane image are obtained in Step S211. The candidate region of interest the horizontal projection of which most meets a preset distribution condition is selected from the plurality of candidate regions of interest in each sagittal plane image as the ROI of the sagittal plane image in Step S212. The preset distribution condition is: the peak values of a plurality of peaks in the horizontal projection are approximate; and the intervals between the plurality of peaks in the horizontal projection are approximate. For example, the projection unit 141 sets a plurality of regions wherein a region extracted as the spinal-region is centrally-located. The projection unit 141 determines these regions as the plurality of candidate ROI. And, the projection unit 141, by a similar process performed by the projection unit 111, allocates a plurality of blocks in the candidate ROI and obtains the horizontal projection of each of the blocks. And, for example, the ROI determination unit 112 determines a candidate ROI in which number of block from which a horizontal projection meeting the distribution condition is obtained is highest, as the ROI.

After the target sagittal plane image of a median sagittal plane passing through a spine is recognized, intervertebral disks can be detected from the target sagittal plane image.

Figure 13:
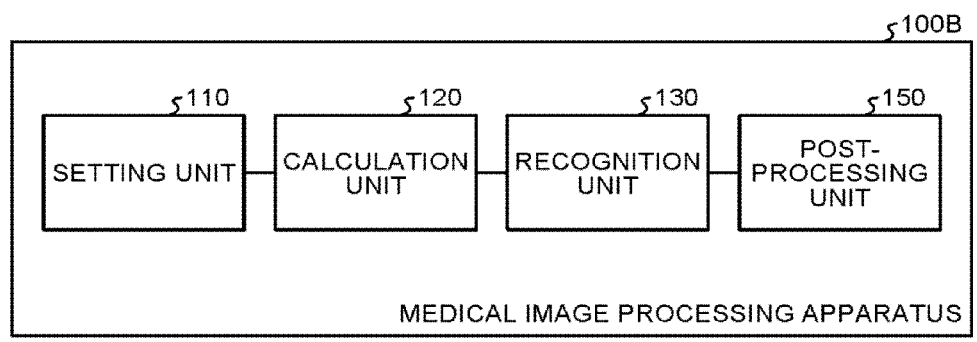
FIG. 13 is a block diagram schematically illustrating a medical image processing apparatus according to another embodiment.
Figure 14:
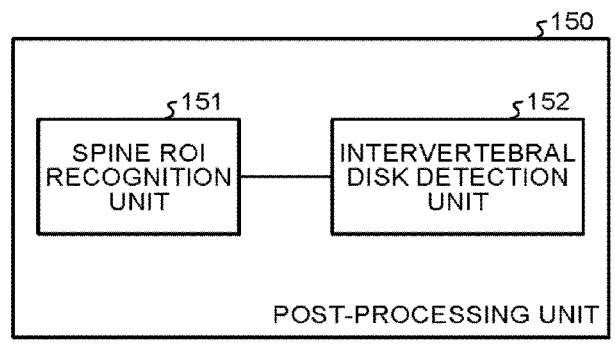
FIG. 14 is a block diagram schematically illustrating a post-processing unit shown in FIG. 13.
Figure 15:
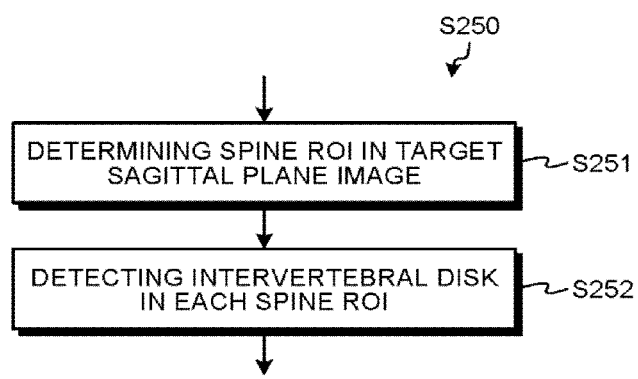
FIG. 15 is a flowchart schematically illustrating the working flow of the post-processing unit shown in FIG. 14.

FIG. 13 is a block diagram schematically illustrating a medical image processing apparatus according to yet another embodiment. As shown in FIG. 13, besides the setting unit 110, the calculation unit 120 and the recognition unit 130 as shown in FIG. 1, the medical image processing apparatus 100B further includes a post-processing unit 150 for post-processing the target sagittal plane image. FIG. 14 is a block diagram schematically illustrating a post-processing unit shown in FIG. 13. In FIG. 14, the post-processing unit 150 includes a spine ROI recognition unit 151 and an intervertebral disk detection unit 152. FIG. 15 is a flowchart schematically illustrating the working flow of the post-processing unit shown in FIG. 14. As shown in FIG. 15, during a post-processing process S250, a spine ROI is determined in a target sagittal plane image in Step S251. Then, intervertebral disks are detected in each spine ROI in Step S252. Step S251 may be executed by the spine ROI recognition unit 151, and Step S252 may be executed by the intervertebral disk detection unit 152. The spine ROI recognition and the intervertebral disk detection can be implemented using various proper existing technologies. For example, the spine ROI recognition unit 151 determines the spine ROI by performing a spinal-region extracting process against the target sagittal plane image again. And, for example, the intervertebral disk detection unit 152 detects the intervertebral disks by an edge enhancement process against the spine ROI.

After the intervertebral disk is detected, information of the intervertebral disk, such as the position and the direction of the intervertebral disk, can be used to, for example, guide the subsequent spine scanning implemented in an image of higher quality.

Figure 16:
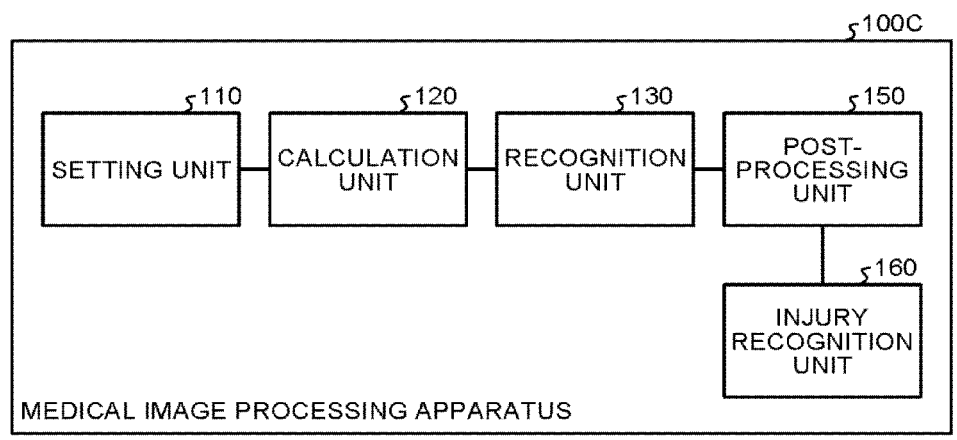
FIG. 16 is a block diagram schematically illustrating a medical image processing apparatus according to another embodiment.
Figure 17:
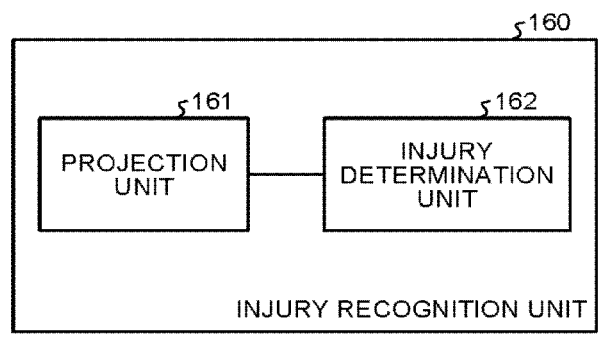
FIG. 17 is a block diagram schematically illustrating an injury recognition unit shown in FIG. 16.
Figure 18:
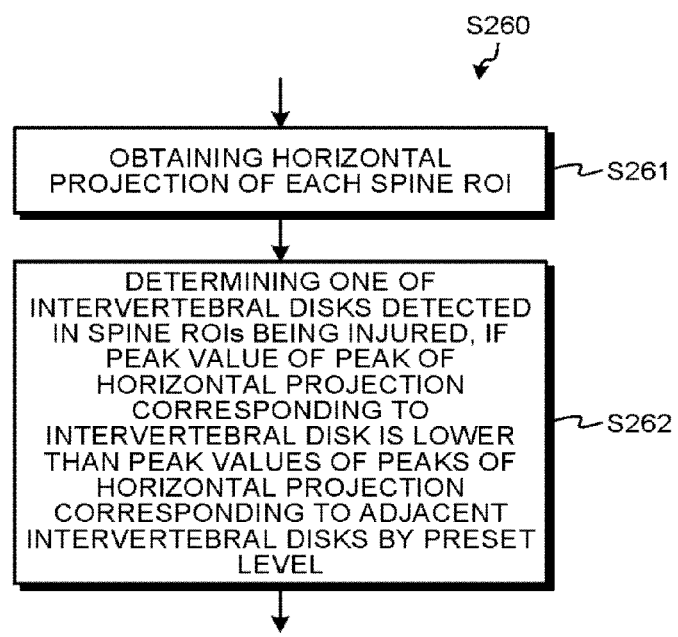
FIG. 18 is a flowchart schematically illustrating the working flow of the injury recognition unit shown in FIG. 17.

Besides, the distribution feature of the horizontal projection of the detected intervertebral disk can also be used to recognize the injury of the intervertebral disk. FIG. 16 is a block diagram schematically illustrating a medical image processing apparatus according to still another embodiment. In FIG. 16, besides the setting unit 110, the calculation unit 120, the recognition unit 130 and the post-processing unit 150 as shown in FIG. 13, the medical image processing apparatus 100C further includes an injury recognition unit 160. FIG. 17 is a block diagram schematically illustrating an injury recognition unit shown in FIG. 16. As shown in FIG. 17, the injury recognition unit 160 includes a projection unit 161 and an injury determination unit 162. FIG. 18 is a flowchart schematically illustrating the working flow of the injury recognition unit shown in FIG. 17. In FIG. 18, during an injury recognition process S260, the horizontal projection of each spine ROI is obtained in Step S261. Then, in Step S262, one of the intervertebral disks detected in the spine ROI is determined as being injured, if the peak value of the peak of the horizontal projection corresponding to this intervertebral disk is lower than the peak values of the peaks of the horizontal projection corresponding to adjacent intervertebral disks by a preset level. When the peak value of the peak in the horizontal projection corresponding to an intervertebral disk is lower than those of the peaks in the horizontal projection corresponding to adjacent intervertebral disks by a preset level, it means that the diameter of this intervertebral disk is much smaller than those of the adjacent intervertebral disks, and thus this intervertebral disk can be determined as being injured. Step S261 may be executed by the projection unit 161, and Step S262 may be executed by the injury determination unit 162. For example, the projection unit 161, by a similar process performed by the projection unit 111, allocates a plurality of blocks in the candidate ROI and obtains the horizontal projection of each of the blocks. And, for example, the injury determination unit 162 determines whether there is an injured intervertebral disk exists or not in each of the blocks.

Figure 19:
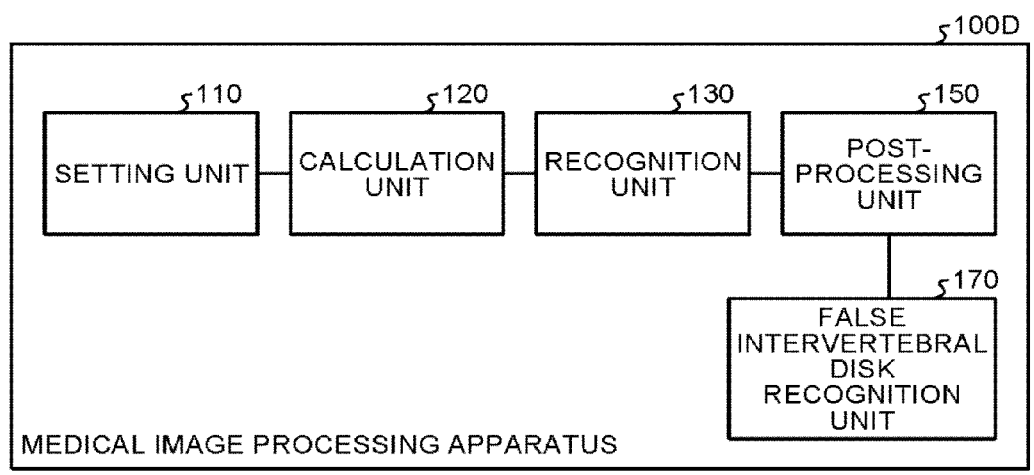
FIG. 19 is a block diagram schematically illustrating a medical image processing apparatus according to another embodiment.
Figure 20:
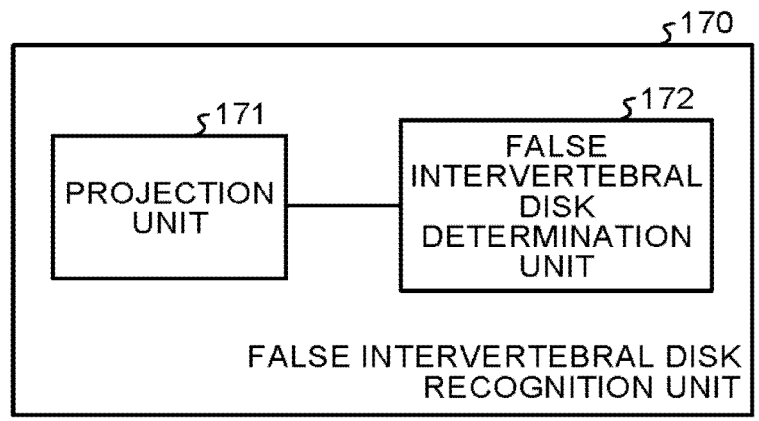
FIG. 20 is a block diagram schematically illustrating a false intervertebral disk recognition unit shown in FIG. 19.
Figure 21:
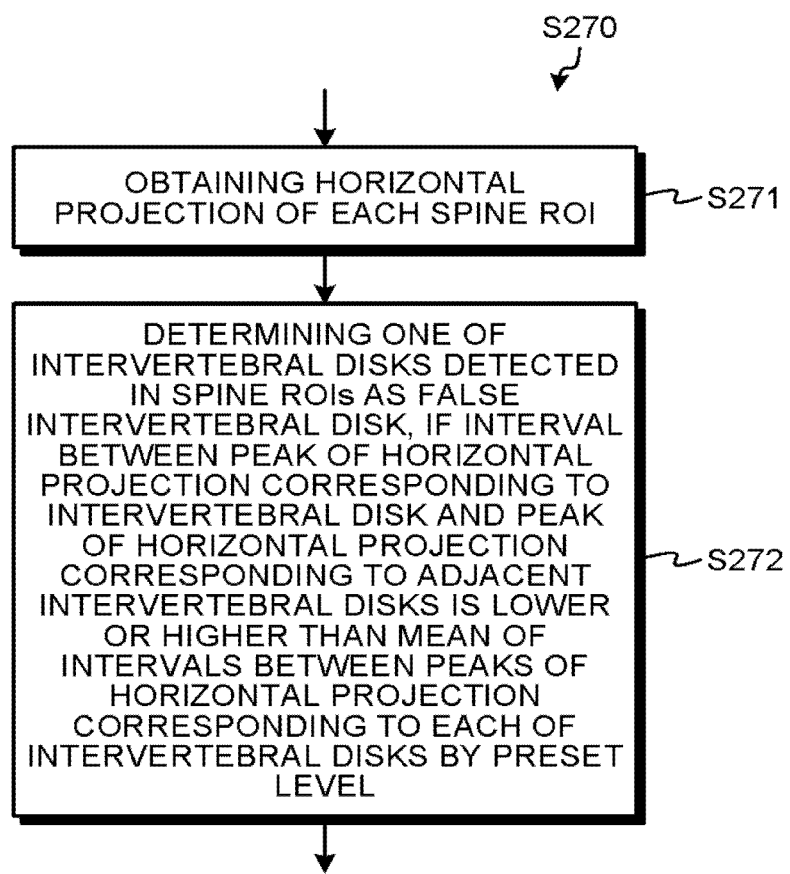
FIG. 21 is a flowchart schematically illustrating the working flow of the false intervertebral disk recognition unit shown in FIG. 20.

The distribution feature of the horizontal projection of the detected intervertebral disk can also be used to recognize a false intervertebral disk. FIG. 19 is a block diagram schematically illustrating a medical image processing apparatus according to yet still another embodiment. As shown in FIG. 19, besides the setting unit 110, the calculation unit. 120, the recognition unit 130 and the post-processing unit 150 as shown in FIG. 13, the medical image processing apparatus 100D further includes a false intervertebral disk recognition unit 170. FIG. 20 is a block diagram schematically illustrating a false intervertebral disk recognition unit shown in FIG. 19. As shown in FIG. 20, the false intervertebral disk recognition unit 170 may include a projection unit 171 and a false intervertebral disk determination unit 172. FIG. 21 is a flowchart, schematically illustrating the working flow of the false intervertebral disk recognition unit shown in FIG. 20. As shown in FIG. 21, in a false intervertebral disk recognition process S270, the horizontal projection of each spine ROI is obtained in Step S271. Then, in Step S272, one of the intervertebral disks detected in the spine ROIs is determined as a false intervertebral disk, if an interval between the peak of the horizontal projection corresponding to this intervertebral disk and the peak of the horizontal projection corresponding to adjacent intervertebral disks is lower or higher than a mean of the intervals between the peaks of the horizontal projection corresponding to each of the intervertebral disks by a preset level. Generally, the intervertebral disks of a spine are arranged at substantially equal intervals. Thus, if the intervals between an intervertebral disk and adjacent intervertebral disks differ greatly from the average interval of all the intervertebral disks, then it is likely that this intervertebral disk is a false intervertebral disk. Step S271 may be executed by the projection unit 171, and Step S272 may be executed by the false intervertebral disk determination unit 172. For example, the projection unit 171, by a similar process performed by the projection unit 111, allocates a plurality of blocks in the candidate ROI and obtains the horizontal projection of each of the blocks. And, for example, the false intervertebral disk determination unit 172 determines whether there is a false intervertebral disk exists or not in each of the blocks.

The medical image processing apparatus and medical image processing method disclosed herein are described above with reference to accompanying drawings. It should be appreciated that in the foregoing medical image processing apparatus, the projection units 111, 141, 161 and 171 may be a plurality of independent unit or one shared projection unit.

As stated above, in the medical image processing apparatus and method disclosed herein, an evaluation index based on the bipolarity feature and the similarity feature of the ROI of an examinee is calculated, and a sagittal plane image in which a certain ROI is located is selected as a target sagittal plane image based on the evaluation index which may be, for example, the energy of the ROI. As the unique image feature of the intervertebral disks of a spine is taken into consideration, the sagittal plane image of median sagittal plane can be obtained more accurately to facilitate the subsequent processing such as the subsequent intervertebral disk detection.

Figure 22:
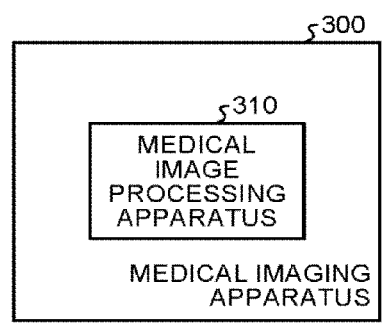
FIG. 22 is a block diagram schematically illustrating a medical imaging apparatus according to an embodiment.

FIG. 22 is a block diagram schematically illustrating a medical imaging apparatus according to an embodiment. In order not to obscure the spirit and scope of the present disclosure, other possible members of the medical imaging apparatus are not shown in FIG. 22. The medical imaging apparatus 300 includes a medical image processing apparatus 310 for processing the medical image generated by the medical imaging apparatus 300. The medical image processing apparatus 310 may be any one of the medical image processing apparatuses 100 and 100A-100D according to any one of the foregoing embodiments. The medical imaging apparatus 300 may be, for example, a Magnetic Resonance Imaging (MRI) apparatus, etc.

The specific way or manner in which the medical image processing apparatus is arranged in a medical imaging apparatus is well known to those skilled in the art and is therefore not described repeatedly here.

As an example, each step of the foregoing medical image processing method and each module and/or unit of the medical image processing apparatus may be implemented as software, firmware, hardware or a combination thereof. In the case where the steps or the modules and/or units are implemented by software or firmware, a program constituting the software for realizing the foregoing method may be installed on a computer having a dedicated hardware structure (e.g. the general computer 2300 shown in FIG. 23) from a storage medium or network, wherein the computer is capable of implementing various functions when stalled with various programs.

Figure 3B:
Figure 23:
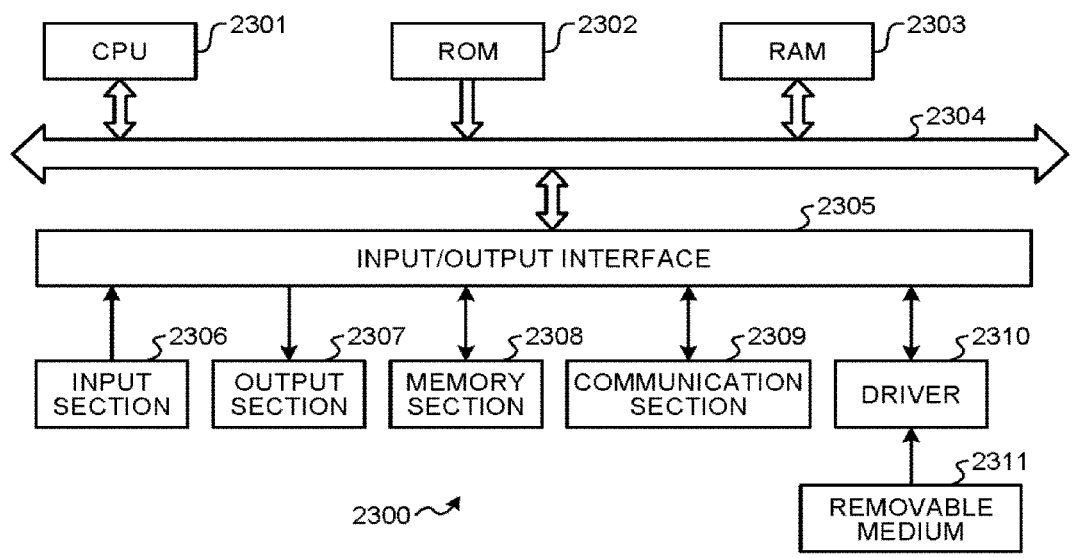
FIG. 23 is a block diagram exemplifying the structure of a computer capable of realizing the embodiments/examples.

FIG. 23 is a block diagram exemplifying the structure of a computer capable of realizing the embodiments/examples. In FIG. 3, a computing processing unit (CPU) 2301 executes various processing according to a program stored in a read-only memory (ROM) 2302 or pr gram loaded to a random access memory (RAM) 2303 from a storage section 2308. The data needed for the various processing of the CPU 2301 may be stored in the RAM 2303 as needed. The CPU 2301, the ROM 2302 and the RAM 2303 are linked with each other via a bus 2304. An input/output interface 2305 is also linked to the bus 2304.

The following components are linked to the input/output interface 2305: an input section 2306 (including keyboard, mouse and like), an output section 2307 (including displays such as a cathode ray tube (CRT), a liquid crystal display (LCD), a loudspeaker and the like), a storage section 308 (including hard disc and the like), and a communication section 2309 (including a network interface card such as a LAN card, modem and the like). The communication section 2309 performs communication processing via a network such as the Internet. A driver 2310 may also be linked to the input/output interface 2305, if needed. If needed, a removable medium 2311, for example, a magnetic disc, an optical disc, a magnetic optical disc, a semiconductor memory and the like, may be installed in the driver 2310, so that the computer program read therefrom installed in the memory section 2308 as appropriate.

In the case where the foregoing series of processing is achieved through software, programs forming the software are installed from a network such as the Internet or a memory medium such as the removable medium 2311.

It should be appreciated by those skilled in the art that the memory medium is not limited to the removable medium 2311 shown in FIG. 23, which has program stored therein and is distributed separately from the apparatus so as to provide the programs to users. The removable medium 311 may be, for example, a magnetic disc (including floppy (registered trademark) disc), a compact disc (including compact disc read-only memory (CD-ROM) and digital versatile disc (DVD), a magneto optical disc (including mini disc (MD)(registered trademark)), and a semiconductor memory. Alternatively, the memory medium may be the hard discs included in ROM 2302 and the storage section 2308 in which programs are stored, and can be distributed to users along with the device in which they are incorporated.

The present embodiment further discloses a program product in which machine-readable instruction codes are stored. The aforementioned medical image processing methods according to the embodiments can be implemented when the instruction codes are read and executed by a machine.

Accordingly, a non-transient memory medium for carrying the program product in which machine-readable instruction codes are stored is also covered in the present embodiment. The memory medium includes but is not limited to soft disc, optical disc, magnetic optical disc, memory card, memory stick and the like.

In the foregoing description on the specific embodiments the features described and/or shown for an embodiment may be used in one or more other embodiments in the same or similar way or combined with those in the other embodiments, or replace those in the other embodiments.

It should be emphasized that the terms 'comprise/include', as used herein, means the existence of a feature, element, step or component in a way not exclusive of the existence or addition of one or more other features, elements, steps or components.

In the aforementioned embodiments and examples, each step and/or unit is represented with a reference sign consisting of figures. It should be understood by those of ordinary skill of the art that the reference signs are merely intended to facilitate description and drawing but are not to be construed as a limitation on an order or any other aspect.

Furthermore, the methods provided in the present embodiments may be performed sequentially, synchronously or independently in accordance with another time sequences, not limited to the time sequence described herein. Therefore, the implementation orders of the methods described in this specification are not to be construed as a limitation to the scope of the present embodiments.

As described above, according to any one of embodiments, it is possible to obtain a sagittal plane image of a median sagittal plane passing through a spine accurately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
    setting circuitry configured to set a region of interest (ROI) of each of a plurality of sagittal plane images of medical images resulting from scanning an examinee;
    calculation circuitry configured to calculate an evaluation index based on a bipolarity feature of each block in the ROI related to change of pixel values and a similarity feature among the blocks; and
    recognition circuitry configured to select the ROI according to the calculation result of the calculation circuitry and recognize a sagittal plane image in which the selected ROI is located as a target sagittal plane image of a median sagittal plane passing through a spine.

2. The medical image processing apparatus according to claim 1, wherein the calculation circuitry comprises:
    pixel energy calculation circuitry configured to calculate a weighted sum of the bipolarity feature value of a block where each pixel of the ROI is located and the similarity feature value of the block with respect to adjacent blocks as energy of the pixel; and
    area energy calculation circuitry configured to calculate a mean or median of the energy of each pixel in the ROI as the energy of the ROI;
    wherein the recognition circuitry selects a ROI having high energy and recognizes a sagittal plane image in which the selected ROI is located as the target sagittal plane image of the median sagittal plane passing through a spine.

3. The medical image processing apparatus according to claim 2, wherein the calculation circuitry further comprises:
    longitudinal band selection circuitry configured to determine a longitudinal band with the highest energy in each ROI, wherein the energy of the longitudinal band refers to the mean or median of the energy of respective pixels in the longitudinal band,
    wherein, the area energy calculation circuitry takes the energy of the longitudinal band determined by the longitudinal band selection circuitry as energy of the corresponding ROI.

4. The medical image processing apparatus according to claim 1, further comprising: false target recognition circuitry which comprises:
    projection circuitry configured to obtain, for the ROI of each target sagittal plane image, horizontal projection of each size-specified area in the ROI; and
    false target determination circuitry configured to determine a target sagittal plane image in which the horizontal projection of a predetermined number of areas in the ROIs thereof fail to meet the following distribution condition, as a false target sagittal plane image:
    the peak values of a plurality of peaks in the horizontal projection are approximate, and
    the intervals between the plurality of peaks in the horizontal projection are approximate.

5. The medical image processing apparatus according to claim 1, wherein the setting circuitry comprises:
    projection circuitry configured to obtain horizontal projection of a plurality of candidate ROIs in each sagittal plane image; and
    ROI determination circuitry configured to select, from the plurality of candidate ROIs in each sagittal plane image, a candidate ROI the horizontal projection of which most meets the following distribution condition as the ROI of the sagittal plane image:
    the peak values of a plurality of peaks in the horizontal projection are approximate, and
    the intervals between the plurality of peaks in the horizontal projection are approximate.

6. The medical image processing apparatus according to claim 1, further comprising: post-processing circuitry which comprises:
    spine ROI recognition circuitry configured to determine a spine ROI in the target sagittal plane image; and
    intervertebral disk detection circuitry configured to detect an intervertebral disk in each spine ROI.

7. The medical image processing apparatus according to claim 6, further comprising: injury recognition circuitry which comprises:
    projection circuitry configured to obtain horizontal projection of each spine ROI; and
    injury determination circuitry configured to determine one of the intervertebral disks detected in the spine ROIs being injured, if the peak value of the peak of the horizontal projection corresponding to this intervertebral disk is lower than the peak values of the peaks of the horizontal projection corresponding to adjacent intervertebral disks by a preset level.

8. The medical image processing apparatus according to claim 6, further comprising: false intervertebral disk recognition circuitry which comprises:
    projection circuitry, configured to obtain horizontal projection of each spine ROI; and
    false intervertebral disk determination circuitry, configured to determine one of the intervertebral disks detected in the spine ROIs as a false intervertebral disk, if an interval between the peak of the horizontal projection corresponding to this intervertebral disk and the peak of the horizontal projection corresponding to adjacent intervertebral disks is lower or higher than a mean of the intervals between the peaks of the horizontal projection corresponding to each of the intervertebral disks by a preset level.

9. A medical imaging apparatus, comprising a medical image processing apparatus which comprises:
setting circuitry configured to set a region of interest (ROI) of each of a plurality of sagittal plane images of medical images resulting from scanning an examinee;
calculation circuitry configured to calculate an evaluation index based on a bipolarity feature of each block in the ROI related to change of pixel values and a similarity feature among the blocks; and
recognition circuitry configured to select the ROI according to the calculation result of the calculation circuitry and recognize a sagittal plane image in which the selected ROI is located as a target sagittal plane image of a median sagittal plane passing through a spine.

10. A medical image processing method, comprising:
setting a ROI of each of a plurality of sagittal plane images of medical images resulting from scanning an examinee;
calculating an evaluation index based on a bipolarity feature of each block in the ROI related to change of pixel values and a similarity feature among the blocks;
selecting the ROI according to the calculation result; and
recognizing a sagittal plane image in which the selected ROI is located as a target sagittal plane image of a median sagittal plane passing through a spine.

11. The medical image processing method according to claim 10, wherein calculating the evaluation index comprises:
calculating a weighted sum of the bipolarity feature value of a block where each pixel of the ROI is located and the similarity feature value of the block with respect to adjacent blocks as energy of the pixel; and
calculating a mean or median of the energy of each pixel in the ROI as the energy of the ROI;
wherein a ROI having high energy is selected, and a sagittal plane image in which the selected ROI is located is recognized as the target sagittal plane image of the median sagittal plane passing through a spine.

12. The medical image processing method according to claim 11, further comprising:
determining a longitudinal band with the highest energy in each ROI, wherein the energy of the longitudinal band refers to the mean or median of the energy of respective pixels in the longitudinal band,
wherein, the energy of the longitudinal band is taken as energy of the corresponding ROI.

13. The medical image processing method according to claim 10, further comprising:
obtaining, for the ROI of each target sagittal plane image, horizontal projection of each size-specified area in the ROI; and
determining a target sagittal plane image in which the horizontal projection of a predetermined number of areas in the ROIs thereof fail to meet the following distribution condition, as a false target sagittal plane image:
the peak values of a plurality of peaks in the horizontal projection are approximate, and
the intervals between the plurality of peaks in the horizontal projection are approximate.

14. The medical image processing method according to claim 10, wherein determining the ROI of each sagittal plane image comprises:
obtaining the horizontal projection of a plurality of candidate ROIs in each sagittal plane image; and
selecting, from the plurality of candidate ROIs in each sagittal plane image, a candidate ROI the horizontal projection of which most meets the following distribution condition as the ROI of the sagittal plane image:
the peak values of a plurality of peaks in the horizontal projection are approximate, and
the intervals between the plurality of peaks in the horizontal projection are approximate.

15. The medical image processing method according to claim 10, further comprising:
determining a spine ROI in the target sagittal plane image; and
detecting an intervertebral disk in each spine ROI.

16. The medical image processing method according to claim 15, further comprising:
obtaining horizontal projection of each spine ROI; and
determining one of the intervertebral disks detected in the spine ROIs being injured, if the peak value of the peak of the horizontal projection corresponding to this intervertebral disk is lower than the peak values of the peaks of the horizontal projection corresponding to adjacent intervertebral disks by a preset level.

17. The medical image processing method according to claim 15, further comprising:
obtaining horizontal projection of each spine ROI; and
determining one of the intervertebral disks detected in the spine ROIs as a false intervertebral disk, if an interval between the peak of the horizontal projection corresponding to this intervertebral disk and the peaks of the horizontal projection corresponding to adjacent intervertebral disks is lower or higher than a mean of the intervals between the peaks of the horizontal projection corresponding to each of the intervertebral disks by a preset level.

* * * * *